United States Patent
Albrant, Jr.

(10) Patent No.: US 7,197,847 B2
(45) Date of Patent: Apr. 3, 2007

(54) DOWNRIGGER LINE RELEASE

(76) Inventor: Clyde Joseph Albrant, Jr., 19322 Hackett Lk. Hwy., Onaway, MI (US) 49765

(*) Notice: Subject to any disclaimer, the term of this patent is extended or adjusted under 35 U.S.C. 154(b) by 0 days.

(21) Appl. No.: 10/974,583

(22) Filed: Oct. 27, 2004

(65) Prior Publication Data
US 2005/0102885 A1    May 19, 2005

Related U.S. Application Data (60) Provisional application No. 60/520,129, filed on Nov. 14, 2003.

(51) Int. Cl.
*A01K 91/00*    (2006.01)
(52) U.S. Cl. .................. 43/43.12; 43/27.4
(58) Field of Classification Search ........... 43/43.12, 43/27.4; 24/602
See application file for complete search history.

(56) References Cited

U.S. PATENT DOCUMENTS

| | | | | |
|---|---|---|---|---|
| 2,085,320 A | * | 6/1937 | Kolstrand | 43/42.72 |
| 2,830,400 A | * | 4/1958 | Perry | 43/43.12 |
| 2,863,200 A | * | 12/1958 | Miller et al. | 24/645 |
| 3,905,148 A | * | 9/1975 | Naone et al. | 43/43.12 |
| 3,974,589 A | * | 8/1976 | Henze et al. | 43/43.12 |
| 4,069,611 A | * | 1/1978 | Dusich et al. | 43/43.12 |
| 4,125,958 A | * | 11/1978 | Cote | 43/43.12 |
| 4,261,130 A | * | 4/1981 | Cudnohufsky | 43/43.12 |
| 4,428,142 A | * | 1/1984 | Shedd et al. | 43/43.12 |
| 4,430,823 A | * | 2/1984 | Henze et al. | 43/43.12 |
| 4,453,336 A | * | 6/1984 | Lowden | 43/43.12 |
| 4,700,505 A | * | 10/1987 | Weber | 43/43.12 |
| 4,817,328 A | * | 4/1989 | Hartley et al. | 43/43.12 |
| 4,974,359 A | * | 12/1990 | Zajic | 43/27.4 |
| 5,189,828 A | * | 3/1993 | Summers | 43/43.12 |
| 5,337,510 A | * | 8/1994 | McCue | 43/43.12 |

\* cited by examiner

*Primary Examiner*—Teri Pham Luu
*Assistant Examiner*—Joshua Michener
(74) *Attorney, Agent, or Firm*—The Weintraub Group, P.L.C.

(57) ABSTRACT

A downrigger release comprises a "scissors-like" release clip, which includes a release arm mounted to an arm holder and adapted to rotate between closed and open positions for carrying and releasing a fishing line, a bifurcated pincer clip, which includes a pair of beams that receive the arm holder, an axially extensible and retractible spring for connecting the pincer clip to a downrigger line, a retainer for retaining and triggering release of the release clip from the pincer clip, the retainer comprising a boss on one of the beams and a detent on the arm holder, release being effectuated by the action of a transverse force camming the boss outwardly from engagement with the detent, a positioner for positioning the release arm in the closed position, and a force adjuster for adjusting the amount of transverse force needed to trigger release of the pincer clip from the release clip.

15 Claims, 3 Drawing Sheets

DOWNRIGGER LINE RELEASE

CROSS-REFERENCE TO RELATED APPLICATION

The present application claims priority to copending U.S. Provisional Application Ser. No. 60/520,129 filed on Nov. 14, 2003, the entirety of which is hereby incorporated into the present application by reference.

BACKGROUND OF THE INVENTION

1. Field of the Invention

The present invention pertains to downrigger fishing systems and techniques for holding a fishing line and lure under the water at a desired depth during trolling, and more particularly, to a novel downrigger line release for releasably connecting a fishing line to a weighted downrigger line.

2. Description of the Prior Art

The use of a "downrigger" for fishing is well known in the art. The purpose of a downrigger is to maintain the lure of a fishing line at a predetermined depth during trolling of a fishing boat to which the downrigger and the fishing line is secured. Without the application of the downrigger, the fishing line would tend to skip along the surface of the water during trolling.

In the typical downrigger fishing arrangement, a "downrigger" line of heavy monofilament, stainless steel or the like is lowered from the fishing boat and carried to depths of fifty or more feet by a "cannon ball" weight of about ten pounds attached to the end of the downrigger line. A "downrigger release" releasably connects a separate fishing line to the downrigger line at a point near the ends of both lines. The weight therefore also carries the fishing line, together with any lures, bait or hooks attached thereto, to the depth to which lowered.

When a fish is hooked, the downrigger release disconnects, freeing the fishing line from the downrigger line, so that the fish may be reeled to the surface in conventional fashion, leaving the downrigger line and weight in the water for separate retrieval.

Various release assemblies have been devised in connection with the downrigger line. In U.S. Pat. No. 4,069,611, issued Jan. 24, 1978 to Dusich et al., a spool has a first end pinned to a bifurcated bracket and a second end adapted to be frictionally engaged by opposed tines of a bifurcated bracket. The fishing line is wrapped about the second end of the fishing line and the second end inserted into frictional engagement by the tines. A disengagement force placed on the line pulls the second end of the spool from frictional engagement with the tines, whereupon the spool rotates away from the tines and fishing line "plays out". A screw member is provided to force the tines towards one another and increase or decease the amount of gripping force applied by the tines against the spool, wherein to preset to amount of force needed to pull the spool from gripping engagement by the tines. A tug on the fish line that is greater than the frictional force engaging the pin will allow the spool to rotate from engagement with the tines and the fishing line to unwrap.

In another conventional downrigger release, a metal clothes pin-like clip is releasably clipped to the downrigger line, a short distance above the weight, and a tapered plastic socket is attached to the clip. A tapered plastic plug with opposite ends has one end adapted to be releasably inserted into the socket and the other end attached to the fishing line. If a fish is hooked, its struggles will pull the plug out of the socket, thereby freeing the fishing line from the downrigger line so that the fish may be reeled to the surface in conventional fashion.

The downrigger release aforesaid suffers a number of disadvantages. For example, it is difficult to adjust the force with which the plug is inserted into the socket, particularly after repeated mating of the plug and socket. If the plug is inserted too tightly into the socket, then a hooked fish may not be able to pull the plug out of the socket, making it extremely difficult to land the fish, since the weighted downrigger line will then have to be retrieved together with the fishing line and the fish. If the plug is inserted too loosely into the socket, then the plug may pull free of the socket in the absence of a fish, necessitating time consuming retrieval of both lines, reinsertion of the plug into the socket, and redeployment of the lines into the water.

The apparatus and downrigger release according to the present invention overcomes the foregoing disadvantages.

SUMMARY OF THE INVENTION

According to this invention there is provided apparatus for trolling at a predetermined depth, using a downrigger line and a fishing line, and a downrigger release member for positioning the lures, hooks, and bait of the fishing line at a desired depth and releasing the fishing line from the release member when a fish bites the hook and pulls away with a predetermined force.

According to one aspect of this invention there is provided a deep trolling apparatus for releasably connecting an end portion of a fishing line to a downrigger line, the apparatus comprising:

a release clip, said release clip comprising first and second clip members and a connecting pin, each said clip member having a first and a second end portion, said second clip member being configured to carry and release said fishing line, and said pin connecting the second end portions together and permitting said clip members to rotate relative to one another between a closed position, wherein the first end portions are superposed, at least in part, and an open position, wherein the first end portions are remote to one another, the second end portion of said second clip member forming an outwardly open concave cutout;

a bifurcated retention member, said retention member comprising a pair of resilient, longitudinally extending, laterally deflectable, cantilever beams, the beams being laterally spaced and defining a longitudinal channel therebetween sized to receive the second end portion of said first clip and maintain said second end portions in superposed relation when said clip members are in said closed position;

retention means for releasably retaining said release clip and said retention member, said retention means comprising one said cantilever beam including a boss and said first retention clip including a detent sized to receive and captivate said boss, said detent and boss being transverse to said cantilever beams, wherein a longitudinal removal force on said retention member and release clip cams said one beam and boss thereon upwardly and outwardly from said detent;

an elongated axially inextensible fastening cable for fastening said release clip to said retention clamp, said fastening cable permitting the release clip to be pulled away from the retention clamp, wherein the clip members may rotate relative to one another and between the closed and open positions; and an elongated axially extensible spring member for fastening said retention clamp to said downrigger line, said spring member extending and pulling back in response to the removal force.

According to another aspect of this invention, a downrigger release comprises:

a "scissors-like" release clip, which includes a release arm pinned to an arm holder, the release arm rotating between a closed position for carrying the fishing line and an open position for releasing the fishing line, a bifurcated pincer clip, which includes a pair of beams that receive the arm holder, an axially extensible and retractable spring for connecting the pincer clip to a downrigger line, retention means for retaining and triggering release of the release clip from said pincer clip, said retention means comprising a boss on one of said beams and a detent on said arm holder, release being effectuated by the action of a transverse force camming the boss outwardly from engagement with the detent, positioning means for positioning the release arm in the closed position, and force adjusting means for adjusting the amount of transverse force needed to trigger release of said pincer clip from said release clip.

According to this embodiment of the invention, the force adjusting means comprises a threaded fastener, positioned at a predetermined location between the free and fixed ends of the cantilever beams, which operates to compress the free ends of the beams towards one another, wherein to narrow the channel defined by the beams of the pincer clip and resist upward deflection of the boss.

Further, the axially extensible and retractable spring for connecting the pincer clip to the downrigger line comprises an elongated hollow tube, the tube formed of an elastomeric material, such as rubber.

According to yet another aspect of this invention, there is provided a method of positioning a lure below the surface of water, wherein said lure is secured to a fishing line and maintained below the water line by a downrigger line, wherein the method comprises the steps of (a) providing a release member, the release member comprising: (1) a "scissors-like" release clip, said release clip including first and second arms, a pin for connecting the arms together in a manner to permit the arms to rotate between a closed position and an open position, and a stop on the first arm for positioning the second arm in the closed position, said second arm for receiving the fishing line, at least in part; (2) a bifurcated pincer clip, said pincer clip including a pair of laterally deflectable cantilever beams, the beams defining a longitudinal channel sized to receive the forward end of the first arm; (3) an elongated axially extensible and retractible spring for fastening the pincer clip to the downrigger line; (4) a rigid tether for connecting the release clip to the pincer clip; (5) snap fit connection means for releasably connecting the forward ends of said beams to the forward end of the first arm; and (6) tension adjustment means for adjusting the amount of tension needed to pull the release clip from snap fit engagement with the pincer clip, wherein to preset a desired pull out tension force on the connection, (b) connecting the opposite ends of said spring, respectively, to an immovable support and said pincer clip;

(c) connecting the pincer clip to said release clip;

(d) fixedly securing the arms together and against rotation relative to said pin;

(e) applying a tension force to the connection in an amount sufficient first to extend the spring and then to overcome the force resisting the release clip from being pulled outwardly and away from the pincer clip;

(f) reading the pull out force to determine if the desired pull out tension force has been set;

(g) adjusting the amount of tension needed to pull the release clip from snap fit engagement with the pincer clip wherein to preset the desired pull out tension force on the connection, the adjusting including compressing the beam ends towards one another and about the first arm;

(h) reading the pull out force to determine if the desired pull out tension force has been set;

(i) repeating the adjusting step until the desired pull out tension force is achieved;

(j) removing the release clip from the pincer clip and freeing the arms for rotation, including rotating the second arm into said open position;

(k) wrapping fishing line to the second arm and rotating the second arm into the closed position, and (l) connecting the release clip to the pincer clip.

In an important aspect according to the method of this invention, the snap fit engagement includes a providing a boss in one beam of the pincer clip, a detent in the first arm of the release clip, and interfitting the boss within the detent, the pull out tension force being sufficient to cam the boss upwardly and outwardly of the detent.

Further and according to the method, the first arm is provided with a stop to locate the first arm in the closed position and superpose the forward ends of the arms, the forward end of the second arm is provided with a V-shaped cutout, and the step of connecting the pincer clip to the release clip includes interfitting the forward end of the other cantilever beam within the V-shaped cut out to maintain the arms in the closed position.

Further, and according to the method, the step of adjusting the amount of tension includes connecting the two beams with a threaded fastener, the fastener extending transversely to the longitudinal channel, and progressively advancing the fastener and compressing the forward end portions of the beams towards one another, wherein the channel is narrowed and the force needed to deflect said one beam and cam the boss thereon in a direction opposite to the direction of compression and outwardly of said detent is increased.

Advantageously, the fishing line retention and release using the "scissoring arm arrangement" working in conjunction with the surgical rubber tubing enhances the pull back motion needed to "hook" and deeply impale the hook into the fish once the fish bites the lure.

Further, the interfitting between the V-shaped nose of the cantilever beam and the V-shaped cut out of the release arm provides locating benefits and also enables the pincer clip to "wiggle" in a direction transverse to the pull out tension force, further enhancing the interplay oftentimes needed in getting the hook impaled into the corner of the fish's jaw.

The present invention will be more clearly understood with reference to the accompanying drawings and to the following Detailed Description, in which like reference numerals refer to like parts and where:

DETAILED DESCRIPTION OF THE PREFERED EMBODIMENT

Figures 1, 1A, 2:
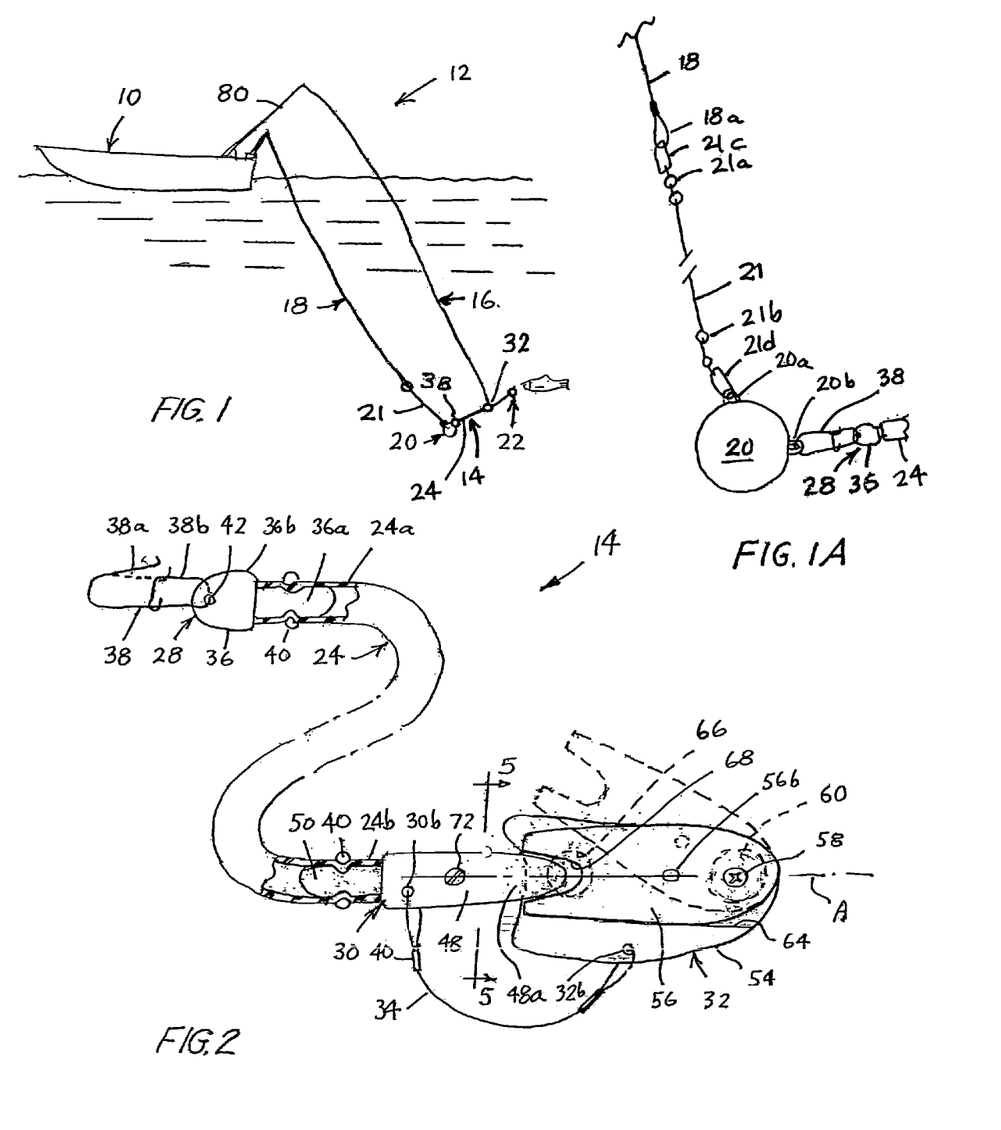
FIG. 1 is an elevation view showing a fishing boat trolling with a downrigger assembly and, according to this invention, a downrigger release assembly for releasably connecting a fishing line to a downrigger line.
FIG. 1A is an enlarged view illustrating the securement of the downrigger line, downrigger release assembly, and a downrigger weight.
FIG. 2 is an enlarged side elevation view of the downrigger release assembly according to the invention, including a stretchable length of rubber tubing connected at one end to the downrigger line.

Turning now to the drawings, FIG. 1 illustrates a fishing boat 10 trolling in water with a downrigger assembly 12. According to this invention, the downrigger assembly 12 includes a downrigger release assembly 14 for releasably connecting a fishing line 16 to a downrigger or down line 18. The downrigger line 18 is of heavy monofilament, stainless steel, or the like, and preferably about 150 to about 200 lbs. test, and the end thereof is provided with a heavy "cannonball" weight 20. Lures, bait, and/or hooks 22 are attached to the end of the fishing line 16. The weight 20 carries the fishing and downrigger lines 16 and 18 to the desired fishing depth.

FIG. 1A shows detail of the securement of the downrigger assembly 14 to the downrigger line 18. The lower end of the downrigger line 18 is provided with an eyelet 18a, and the weight 20 is provides with a pair of eyelets 20a and 20b. A drop wire or line 21 extends between the eyelet 18a formed at the lower end of the downrigger line 18 and the eyelet 20a formed on the weight 20 and has opposite ends thereof formed into respective eyelets 21a and 21b. Preferably, the drop wire 21 is about 6 to 9 inches long and about 90 lb. test. A first connective eyelet or ring 21c connects the eyelet 18a at the lower end of the downrigger line 18 to the eyelet 21a at the upper end of the drop wire 21. A second connective eyelet or ring 21d connects the eyelet 21b at the lower end of the drop wire 21 and the eyelet 20a on the weight 20. Additionally, a ring clip 38, provided at one end of the downrigger release assembly 14, is connected to the eyelet 20b on the weight 20.

The purpose of the drop wire 21 is to break-off the cannon ball weight 20 should it become entangled with rock, underwater objects or another line. The drop wire 21 is typically about 6 to 9 inches long.

While the weight may be thus lost, loss of the downrigger line 18 is avoided. Further, as a result of a direct attachment to the ball 20, the downrigger release assembly 14 is prevented from sliding upwardly to the surface.

Provision of several eyelets is desirable in many applications. As shown, the ring clip 38 is attached to the eyelet 20b on the cannonball 20.

Referring to FIG. 2, the downrigger release assembly 14 comprises an elongated elastic member 24 having opposite ends 24a and 24b, an attachment member 28 at the end 24a of the elastic member 24 for connecting the elastic member to the downrigger line 18, a bifurcated pincer clip 30 at the end 24b of the elastic member, a scissors-like release clip 32 for carrying and releasing the fishing line 16, and a tether line 34 for securing the release clip 32 to the pincer clip 30.

The elastic member 24 is elongated, spring-like, and axially extensible and retractible, desirably to provide extra axial stretch out and pull back motion. In the embodiment shown, the elastic member 24 is a hollow tube that is comprised of rubber or like elastomeric material, such as Tygon® and like surgical tubing material. In a preferred embodiment, the tubing has an inside diameter of about ⅛ inch, an outside diameter of about ¼ inch, and a length of approximately one foot.

The attachment member 28 includes a connector 36 and an attachment ring clip 38. The connector 36 has a rearward end portion 36a, which is inserted into and fixedly connected by a retention band 40 to the rearward end 24a of the elastic tubing 24, and a forward end portion 36b, which is provided with a bore 42 for receiving the ring clip 38.

The ring clip 38 is generally elliptical in shape and formed by a thin metal wire, much like a paper clip, and includes a U-shaped forward beam 38a and a U-shaped rearward beam 38b. The forward beam 38a is resilient and adapted to "snap open", to receive or release the eyelet 20b of the weight 20, and "snap closed", to captivate the eyelet 20b in the ring clip 38. The rearward beam 38b is received in the bore 42 and secures the ring clip 38 to the connector 36 in a manner that the tubing 24 may swing or pivot relative to the connection with the weight 20.

The ring clip 38 permits easy attachment to and release from the weight 20. If desired, the ring clip could comprise the connective rings 21c and 21d used for connecting the eyelets of the drop wire or line 21 and downrigger line 18.

Figures 3, 4, 5, 6, 7:
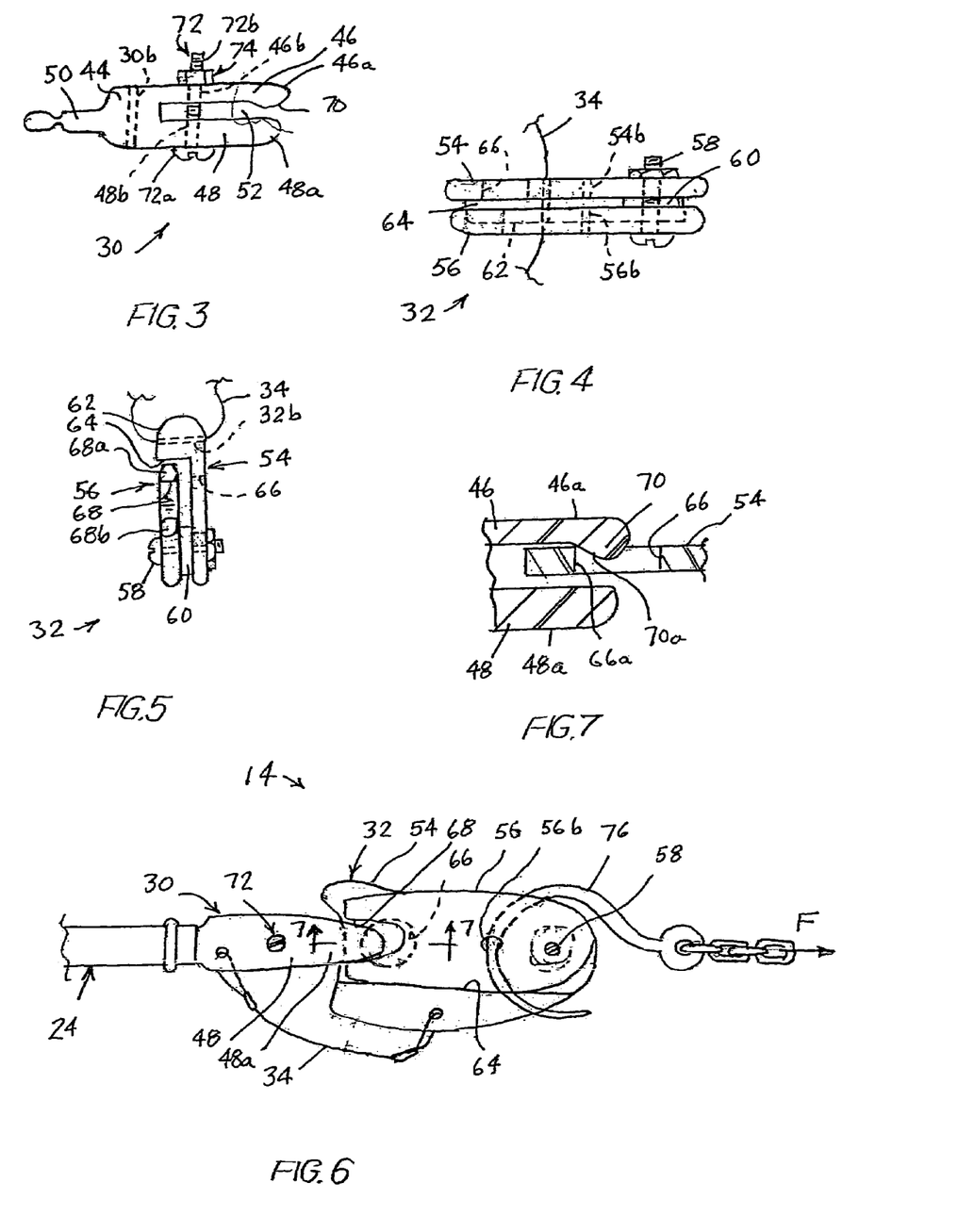
FIG. 3 is an enlarged top view of a pincer clip that is connected to the other end of the tubing, the pincer clip having means for adjusting the tension force needed to release the fishing line.
FIG. 4 is an enlarged top view of a "scissors-type" release clip for connecting to the fishing line, the release clip being connectible to the pincer clip with a snap fit engagement.
FIG. 5 is an end view taken along line 5—5 of FIG. 2 of the release clip showing an arm holder and a release arm.
FIG. 6 is an enlarged side view showing a method of setting the release force in the release assembly.
FIG. 7 is an enlarged section view taken along line 7—7 of FIG. 6 showing the snap fit engagement between the pincer clip and the arms of the release clip.

As shown in FIGS. 2 and 3, the bifurcated pincer clip 30 comprises a central body 44, a pair of forwardly extending elongated laterally spaced tines or cantilever beams 46 and 48, and a rearwardly extending body 50 that is inserted into and fixedly connected to the forward end 24b of the elastic tubing 24 by a retention band 40. Preferably, the pincer clip 30 is of Plexiglas, plastic or like resilient material and one piece. The cantilever beams 46 and 48 are generally parallel to one another and form a longitudinal channel 52 therebetween sized to receive the release clip 32, at least in part.

As shown in FIGS. 2, 4 and 5, the release clip 32 is "scissors-like" and includes an arm holder 54, a release arm 56 for receiving and carrying an end portion of the fishing line 16 wound thereabout, and a pin 58 for connecting the rearward end of the release arm 56 to the rearward end of the arm holder 54 such that the forward end of the release arm 56 may rotate (as shown in phantom in FIG. 2) relative to the forward end of the arm holder 54. The components of the release clip 32 are of Plexiglas, plastic or like resilient material. Preferably, an annular washer or spacer 60 is positioned about the pin 58 whereby to space the arm holder 54 from the release arm 56.

The arm holder 54 is flat, generally elliptical in shape, and includes a raised laterally offset step 62. The step 62 extends longitudinally between the opposite ends of the arm holder 54 and defines a stop 64 for positioning the forward end portion of the release arm 56 relative to the forward end portion of the arm holder 54. Importantly, the forward end portion of the arm holder 54 includes a circular cutout, which forms a detent 66.

The release arm 56 is flat and generally similar in shape to the arm holder 54. Preferably, the forward end of the release arm 56 is contoured and provided with a concave V-shaped cutout 68.

The release arm 56 is adapted to rotate, relative to the pin 58, from a first or scissors closed position and a second or scissors open position. In the scissors closed position, the forward end portion of the release arm 56 is positioned against the stop 64, and the V-shaped cut-out 68 is juxtaposed with the detent 66 and the forward end portion of the arm holder 54. In the scissors open position, the forward end portion of the release arm 56 is rotated upwardly and away from the detent 66 and the forward end portion of the arm holder 54.

Importantly, the release arm 56 has generally planar parallel surfaces, a smooth exterior, and is tapered toward the forward end, wherein to release the fishing line undamaged and free of any foreign materials, in a manner to be described hereinbelow.

The forward end portions 46a and 48a, respectively, of the cantilever beams 46 and 48 are generally coextensive with one another and form generally rounded V-shaped noses 46a and 48a. Preferably, the V-shaped nose 48a of the cantilever beam 48 is configured to be received within the V-shaped cutout 68. The mating interconnection between the noses 48a and 68 operates, in part, to interlock the release clip 32 with the pincer clip 30.

The V-shaped cutout 68 is formed by a top fork 68a and a bottom fork 68b and is adapted to be superposed about the detent 66 when the arm holder 54 and the release arm 56 are in the "scissors" closed position. The top fork 68a of the release arm 56 is used in assembly and release of the fishing line 16, as will be described in greater detail hereinbelow.

The release clip 32 is arranged such that the release arm 56 is in the scissors closed position and the V-shaped cutout 68 thereof is juxtaposed with the detent 66, whereupon the arm holder 54 is slidably inserted into the channel 52 formed between the beams 46 and 48 of the pincer clip 30. Simultaneously, the rounded V-shaped noses 46a and 48a of the cantilever beams 46 and 48 are juxtaposed with the detent 68 and the forward end 48a of the cantilever beam 48 is positioned within the V-shaped cutout 68 of the arm holder 54.

Preferably and according to this invention there is provided means for resisting the release clip 32 from being pulled from the channel 52 of the pincer clip 30. According to this aspect of the invention, a boss 70 is provided on the nose 46a of the cantilever beam 46, the boss projecting in a direction perpendicular to the beam 46 and in a direction towards the beam 48.

As shown in FIG. 7, the boss 70 is dimensioned to be received in the detent 66 and is provided with an angled face 70a which engages the transverse interior wall 66a of the detent 66. The face 70a is at an acute angle to the cantilever beam 46 to enable the boss 70 to be cammed upwardly and outwardly of the detent 66. Preferably, the acute angle is between 30 degrees and 50 degrees relative to the beam, and more preferably, at about 45 degrees thereto. The boss 70 and detent 66 are dimensioned to permit some angular "wiggle" movement of the forward end of the pincer clip 30 relative to the forward end of the retention clip 32. Although the boss 70 projects upwardly from the cantilever beam 46, the boss could project upwardly from the beam 48, or a detent engaging boss could project upwardly from each of the beams 46 and 48.

The cantilever beams 46 and 48 of the pincer clip 30 operate to receive the forward end of the arm holder 54 and position the boss 70 within the detent 66, in a "snap-fit", whereby the pincer clip 30 retains the release clip 32. A transverse separating force "F" acting along a line passing longitudinally between the pin 58 of the release clip 32 and the center axis through the central body 44 of the pincer clip 30, if sufficient, will operate to place a force on the angled face 70a and cam the boss 70 upwardly and outwardly from the detent 66. For this to happen, the cantilever beam 46 must deflect away from the arm holder 54.

Resistance to outward deflection of the cantilever beams 46 and 48 will increase the longitudinal separating force needed to overcome the retention force acting between the boss 70 and the detent 66. According to this aspect of the invention, an arrangement for adjusting the amount of separating tension force needed to deflect the beam 46 is provided.

The cantilever beams 46 and 48 are interconnected by a threaded fastener 72, having a fastener head 72a and an elongated threaded fastener body 72b, and an associated hex nut 74. The fastener body 72b is passed through respective aligned through bores 46b and 48b in the cantilever beams 46 and 48, and the fastener head 72a is abutted against the cantilever beam 48. The hex nut 74 is threadably engaged with the fastener body 72b and abutted against the other cantilever beam 46.

Further threadable advance of the nut 74 towards the fastener head 72a forces the forward nose portions 46a and 48a of the cantilever beams 46 and 48 towards one another. Deflection of the beams 46 and 48 and their nose portions 46a and 48a cause the channel 52 to narrow.

Importantly, the position of the fastener locating bores 46b and 48b relative to the fixed and free ends of the cantilever beams 46 and 48 have a direct bearing on the stiffness of the beam structure and the ability of the forward nose portion 46a to deflect away from the nose portion 48a. If the bores 46b and 48b and associated fastener 72 are located closer to ends of the beams 46 and 48 where fixed to the center body 44, the nose portions 46a and 48a will be longer and more capable of deflecting away from one another. Contrariwise, if the bores 46b and 48b and the fastener 70 are closer to the free ends 46a and 48a of the beams. For any given location of the fastener 72 and receiving bores 46b and 48b relative to the cantilever beams, the amount of tension force that is needed to pull the release clip 32 from the channel 52 of the pincer clip 30 can be adjusted by selective closure of the nose portions 46a and 48a by the fastener 72 and hex head 74.

In an illustrative embodiment, each beam 46 and 48 is about 1 3/16 inch long (the distance measured from the free end 46a and 48a to the fixed end to the body 44), and the fastener bores 46b and 48b are located about 7/8 inch from the free ends of the beams (or about 5/16 from the fixed end). As a ratio, the fastener 72 is located such that about 74% (or 3/4 of each beam) is forwardly of the fastener. Each nose portion 46a and 48a tapers from a width of about 9/16 inch, where joined to the body 44, to about 1/2 inch, at the fastener bores 46b and 48b, and to about 3/8 inch, at the beginning of the boss 70, which forms a "raised land" that extends about 7/16 inch inwardly from the free end of the nose. Further, the beam 48 is generally uniform and about 9/32 inches thick, and the beam 46 is thinner and is about 7/32 inches thick. The beams 46 and 48 are separated by about 3/32 inches, from the fixed end to the boss 70. The boss 70 projects into the channel 52 with the upward projection thereof being about half the separation between the beams.

The tether line 34 is a thin elongated stainless steel wire with the opposite end portions thereof being connected to a respective bore 30b and 32b in the pincer clip 30 and the release clip 32, thereby fixedly connecting the pincer clip 30 to the release clip 32. In operation, each end portion of the tether line is passed through a respective bore, formed into a loop, and fixedly banded by a retention band 40. The connection is such that the tether line 34, if fully extended, will permit the release clip 32 to "travel" a predetermined distance from the pincer clip 30 to enable fishing line 16 to play out. The tether line 34 is attached to the pincer clip 30 and to the release clip 32 at points that facilitate leveraging the release arm 56 into the open position when struck by a fish.

In the practice of this invention, and referring to FIG. 6, a desired release force is set. First, the release assembly is 14 connected together. The bifurcated pincer clip 30 is snapped into releasable retaining connection with the release clip 32, with the forward nose 48a of the cantilever beam 48 disposed in the V-shaped cutout 68 of the release arm 56 and the boss 70 from the cantilever beam 46 seated in the detent 66. The attachment ring clip 38, at the other end of the surgical tubing 24, is connected to a solid immovable object (not shown). Initially, the cantilever beams 46 and 48 are fitted about the arm holder 54 and the boss 70 disposed in a snap-fit engagement with the detent 66. The beams are not compressed towards one another by the fastener 72 and nut 74.

A hook 76 of a conventional electronic fish weight scale (not shown) is passed through aligned hook-up bores or holes 54b and 56b in the arm holder 54 and the release arm 56, and the scale is set to zero.

An axial stretching or tension force "F" is gradually placed on the release assembly 14, causing the surgical elastic tubing 24 to stretch (or elongate). The surgical tubing 24 will continue to stretch until the tension force applied exceeds the frictional force operating to prevent the boss 70 from being cammed upwardly and outwardly form the detent 66 the boss 70. When this happens, the release clip 32 will "pop out" of the pincer clip 30. This scale reading is read.

Depending on the fish being sought, and the amount of separating force desired, the lateral separation between the forward end portions of the cantilever beams 46 and 48 is reduced. The end portions of the beams are driven towards one another by relative threaded engagement between the fastener 72 and the hex nut 74. The force needed to separate (i.e., deflect) the nose portion 46b and the boss 70 in a direction transverse to and away from the detent 66 and the nose portion 48b is increased.

For example, the "tripping" or release load may be set at 3 to 4 pounds for salmon; and less for smaller fish, planer board usage, and when using ultra-light fishing line. Preferably, the tension should equal 25% of the fishing line strength and not exceed 4 pounds with this size unit. If the release force is unacceptable, the fastener is used to compress the beams 46 and 48 towards one another, thereby increasing the tension force needed to cam the boss 70 from the detent 66 and pull the release clip 32 from the beams 44 of the pincer clip 30.

Figure 8:
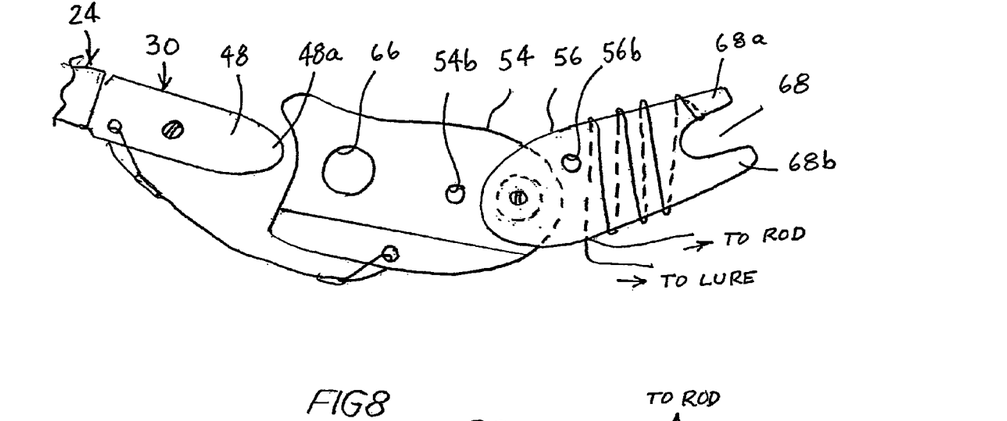
FIG. 8 is side view showing the fishing line being wound about the release arm of the release clip.

Next, and referring to FIG. 8, the hook 76 is removed, the release clip 32 is removed from the bifurcated pincer clip 30, and fishing line 16 is connected to the release arm 56 of the release clip 32. The desired lure 22 is positioned so as to be about 10 to 150 feet from the release assembly 14.

The release arm 56 is rotated away from the arm holder 54, and from the "scissors" closed position, and into the "scissors" open position. Fishing line is looped and attached onto the top fork 68a of the release arm 56 and wound four times, beginning with the first wrap downwards on the backside of the release arm and ending with the fourth wrap downward on the backside of the release arm 56.

Figure 9:
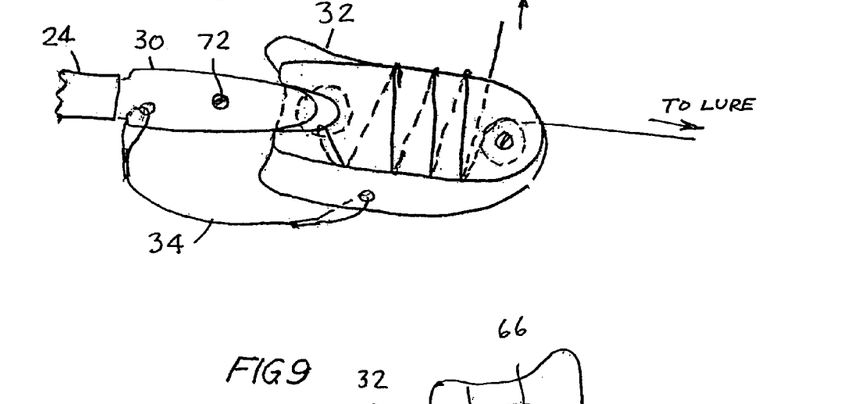
FIG. 9 is a side view illustrating the downrigger assembly ready for use, wherein fishing line has been wrapped about the release arm and like ends of the arm holder and release arm are connected in a releasable snap fit to the pincer clip.

Referring next to FIG. 9, the release arm 56 is then rotated back into the "scissors" closed position, and against the stop wall 64, and the release clip 32 "plugged into" the channel 52 formed by the cantilever beams 46 and 48 of the bifurcated pincer clip 30. The forward nose portion 48a of the pincer clip 30 and the V-shaped cutout 68 cooperate to keep the release arm 56 in the closed position.

Generally, the pincer clip 30 and the release clip 32 are initially symmetrical about an axis "A" extending through the fastener 72 and the pin 58, which axis is the line along which the release force would be directed. However, as indicated, the interfitment between the detent 66 and the boss 70 and the nose 48a and the V-shaped cut out 68 permit a small amount of "wiggle" of the forward end of the pincer clip 30 relative to the release clip 32, whereupon the pincer clip 30 and the release clip may be at acute angle to one another.

Next, as shown in FIG. 1, the downrigger weight 20 is lowered to a desired depth. The reel is engaged and the line tightened until the fishing rod 80 bends slightly. Preferably, the reel drag is set on a light setting.

Figure 10:
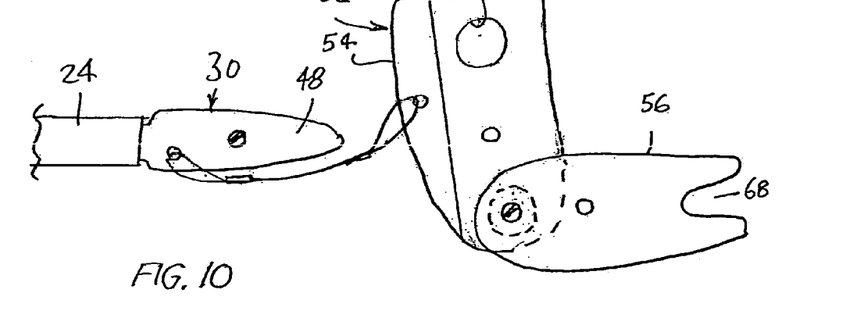
FIG. 10 is a side view illustrating the fishing line being released from the downrigger release assembly.

When the fish strikes the lure and begins to run, the surgical tubing 24 will stretch out, some 2 to 3 feet. Upon feeling this resistance, the fish will attempt to spit out the lure. The surgical tubing 24 will then recoil, causing the lure to slide into the corner of the fish's jaw; and, oftentimes, start hook penetration. Upon feeling this action, the fish will bolt and again stretch the surgical tubing, setting the fish hook(s) deeper, until the fish pull force exceeds the 4 pounds tension force set in the release assembly 14.

At this point, the release clip 32 will break free from the pincer clip 30. Simultaneously, the release clip 32 is pulled the distance permitted by the tether line 34, the release arm 56 rotates into the "scissors" open position, and the fishing line is free to play out from the release arm 56 and break free from the downrigger line 18.

Advantageously, the fishing line retention and release using the "scissoring arm arrangement" working in conjunction with the surgical rubber tubing enhances the pull back motion needed to "hook" and deeply impale the hook into the fish once the fish bites the lure.

Further, the interfitting between the V-shaped nose of the cantilever beam and the V-shaped cut out of the release arm provides locating benefits and also enables the pincer clip to "wiggle" in a direction transverse to the pull out tension force, further enhancing the interplay oftentimes needed in getting the hook impaled into the corner of the fish's jaw.

While a preferred embodiment of the present invention is shown and described, it is envisioned that those skilled in the art may devise various modifications of the present invention without departing from the spirit and scope of the appended claims. The invention is not intended to be limited by the foregoing disclosure, but only by the following appended claims.

What is claimed is:

1. A downrigger device for trolling comprising:

a bifurcated pincer clip, said pincer clip having a rearward end portion and a pair of laterally spaced cantilever beams extending from said rearward end portion, said beams forming a channel and terminating in deflectable forward end portions, an axially extensible spring for connecting said rearward end portion to a weighted downline, a release clip for releasably holding fish line, said release clip being separate from said pincer clip and including an arm holder having forward and rearward end portions, and a release arm having forward and rearward end portions, said release arm being pinned at the rearward end thereof to the rearward end portion of the arm holder and adapted to rotate relative to the pinned connection between a fish line retaining position and a fish line releasing position, the forward end portion of said arm holder being releasably received within said channel when the release arm is in said fish line retaining position and the release clip separating from any connection to said pincer clip when said release arm is in said fish line releasing position, first retention means for retaining the forward end portion of said arm holder in said channel and releasing said arm holder when a predetermined force in said spring is exceeded, and second retention means for releasably retaining the forward end portion of said release arm in said fish line retaining position, wherein said first retention means comprises the forward end portions of one and the other of said release clip and pincer clip being provided with an upwardly projecting boss and a detent, said boss being received in said detent to retain said clips together and said release arm in the fish line retaining position, whereby when a separating force of sufficient magnitude is applied to the pincer clip and said spring by a force from said fishing line placed on said release clip, said boss is driven upwardly and outwardly from the detent, the release arm is freed to rotate into said fish line releasing position and the pincer clip is separated from the release clip.

2. The downrigger device as claimed in claim 1, wherein said second retention means comprises the forward end portion of at least one cantilever beam and the forward end portion of the release arm being adapted to releasably interlock with one another when the release arm is in said fish line retaining position.

3. The downrigger device as claimed in claim 2, wherein the forward end portion of said at least one cantilever beam is generally V-shaped, and the forward end portion of said release arm includes an outwardly open V-shaped recess, the recess being sized to receive and interlock with the V-shaped forward end portion of said at least one cantilever beam.

4. The downrigger device as claimed in claim 3, wherein the release arm is generally flat and plate-like and said V-shaped recess therein is formed by a pair of fork members, and said fish line is releasably wrapped about the body of the release arm and a longitudinal axis extending between the opposite ends thereof, the fish line being adapted to play out from said release arm when the V-shaped end portion of said pincer clip is separated from the release clip and the release arm rotates into said fish line releasing position.

5. A downrigger device for trolling comprising:

a release clip and a pincer clip adapted to connect to and disengage from any connection with said release clip, said release clip for releasably holding a length of fishing line, said release clip including (i) an arm holder having forward and rearward end portions, (ii) a release arm having forward and rearward end portions and adapted to receive and release a length of fish line wrapped thereabout, the forward end portion being formed to include an outwardly open contoured recess, (iii) means for pinning the forward end portions of said release arm and said arm holder to one another and in a manner that the release arm may rotate relative to the arm holder and between a line holding first position and a line releasing second position, and (iv) means for positioning the rearward end portion of said release arm in the first position, said pincer clip including (i) a body for attachment to a weighted downline, and (ii) a pair of laterally separated longitudinally extending pincer members, the pincer members extending forwardly from the body and defining a longitudinal channel therebetween for receiving the rearward end portion of said arm holder, the forward end portions of said pincer members being laterally deflectable towards and away from one another with the forward end portion of one said pincer member being fittable within the contoured recess wherein to releasably retain the release arm is in said line holding first position, and first means for releasably connecting the forward end portions of said pincer members and said pincer clip to the rearward end portion of said arm holder, said first means for releasably connecting permitting said release clip to separate from any connection with the pincer clip when the release arm is in said line releasing second position, wherein said first means for releasably connecting comprises a boss having an angled surface and a detent sized to receive said boss, said boss and said detent being provided in one and the other, respectively, of the arm holder of said release clip and one of the two pincer members of said pincer clip, said boss projecting in a direction generally perpendicular to said pincer members and said release arm and the angled surface of said boss being adapted to engage the detent and connect the pincer clip to the arm holder, a longitudinal separating force of predetermined magnitude on said release clip and pincer clip when connected together substantially simultaneously (a) transmitting the force to the boss and move the angled surface thereof against the detent, causing the pincer member to deflect away from the release arm and the boss to be driven from engagement with the detent, (b) the release clip to separate from any connection with the pincer clip, (c) the release arm to rotate from the line holding first position to the line releasing second position, and (d) the fish line to unwrap and be released from the release arm.

6. The downrigger device as claimed in claim 5, further comprising second means for increasing the magnitude of separating force needed to disengage the boss from seated engagement with the detent and to separate the pincer clip from gripping connecting engagement with the arm holder of the release clip.

7. The downrigger device as claimed in claim 6, wherein said second means comprises a threaded fastener extending between and connecting said pincer members to one another, and a fastener head threadably connected to the fastener, threadable advancement of the fastener head relative to the threaded fastener forcing the pincer members and the forward ends thereof to approach one another and the entry into the longitudinal channel to narrow, thereby increasing the longitudinal separating force needed to force the angled surface against the detent and drive the boss upwardly and outwardly from the detent and separate the pincer members from engagement with the release clip.

8. The downrigger device as claimed in claim 5, further comprising an axially extensible resilient spring having opposite ends, one and the other spring end, respectively, connected to said weighted downline and the body of said pincer clip, said spring having a predetermined spring constant and adapted to resist extension in response to a separating force placed on the release arm when gripped by the pincer clip.

9. The downrigger device as claimed in claim 5, wherein said means for positioning comprises a stop on said arm holder, said stop being adapted to position the contoured recess of the release arm in said line holding first position.

10. The downrigger device as claimed in claim 9, wherein said first means for releasably connecting comprises a detent formed in the rearward end portion of said arm holder, and a boss having an angled surface formed in the rearward end portion of one of said pincer members, said boss projecting upwardly from said one pincer member and towards the other of said pincer members for receipt in said detent when said pincer members are connected to the rearward end portion of said arm holder with said angled surface operating to disengage the boss from the detent upon application of a longitudinal separating force acting on the connection between the clips, and said stop registering the contoured recess of said release arm with the detent of said arm holder when the release arm is in the line holding first position.

11. A method of using the downrigger device of claim 1, comprising the steps of:
(a) providing and connecting the opposite ends of an elongated rigid tether to the pincer clip and the release clip,
(b) presetting a desired separating force, comprising the steps of:
  [i] connecting the opposite ends of said spring to an immovable support and the pincer clip,
  [ii] connecting the pincer clip to said release clip, including interlocking the cantilever pincer beams with the rearward end of the arm holder and the release arm with the forward end of at least one beam to prevent rotation of the release arm relative to the arm holder and inhibit separation of the clips,
  [iii] applying a separating force to the connection in an amount sufficient to extend the spring and also to overcome the connecting force resisting the release clip from being pulled outwardly and away from the pincer clip,
  [iv] reading the separating force required to determine if a desired separation force has been set, and
  [v] if the force needs to be increased, the gap between the forward ends of the beams is narrowed, and steps [c] and [d] are repeated until a desired pull-out separation force is set,
(c) removing the release clip from connection with the pincer clip and rotating the release arm into said line releasing second position,
(d) wrapping fishing line about the release arm and rotating forward end portion of the release arm into the line holding first position,
(e) connecting the release clip to the pincer clip in releasable connected relation with one another, said connecting including interlocking the forward end of the one beam member into a V-shaped recess formed in the forward end portion of the release arm wherein to releasably retain the release arm in the fish line retaining postion,
(f) disconnecting the spring from the immovable object and connecting same to a downweight, which weight is connected to a down line, and
(g) lowering the downweight and downline, and the downrigger device, into the water, the weight carrying and maintaining the downrigger device below the water.

12. A downrigger device for trolling comprising:
a release clip, said clip including an arm holder and a release arm releasably carrying fishing line, said release arm being pinned to said arm holder at a rearward end thereof for swivelling rotation relative thereto and movement between a first position when storing the fishing line wrapped about the arm and relative to an axis extending between the free and pinned ends of the release arm and a second position when releasing the fishing line,
a pincer clip for releasably gripping and retaining the forward end portion of said arm holder, said pincer clip separating from any connection to said release clip when said release arm is in said second position,
means for positioning and retaining the release arm in the first position, and
a resilient member for connecting the pincer clip to a weighted downline wherein
said pincer clip includes a clip body and two cantilever beams extending longitudinally forward from said clip body, the beams forming a channel for receiving the forward end portion of said arm holder and the free ends of the beams being laterally deflectable towards and away from one another to releasably connect to the arm holder of the release clip, at least one said beam including a boss at the forward end portion thereof that projects therefrom and is disposed in the channel, and
said arm holder includes a detent formed in the forward end portion thereof for releasably captivating said boss when the forward end portion of said arm holder is received in said channel.

13. The trolling device as claimed in claim 12, wherein a boss projects from each beam member, each boss being received in said detent.

14. The trolling device as claimed in claim 13, wherein said means for positioning and retaining comprises
a V-shaped recess formed at the forward end portion of said release arm, said cutout recess for interlocking receipt of the forward end portion of one of said cantilever beam members when the pincer clip grips and is in connected relation with the forward end portion of the arm holder, and a stop formed on said arm holder, said stop positioning the release arm in the first position and registering the V-shaped recess formed therein with the detent provided in the forward end portion of the arm holder.

15. The downrigger device as claimed in claim 12, further including an axially extensible spring, said spring comprising an axially elongated tube of elastomeric material with one spring end connected to the clip body and the other spring end adapted to connect to a downline.

* * * * *